United States Patent
Sun et al.

(10) Patent No.: US 10,633,017 B2
(45) Date of Patent: Apr. 28, 2020

(54) BRUSHLESS DIRECT CURRENT MOTOR AND ELECTRIC POWER STEERING SYSTEM COMPRISING SAME

(71) Applicant: Johnson Electric S.A., Murten (CH)

(72) Inventors: Ning Sun, Shenzhen (CN); Rui Feng Qin, Hong Kong (CN); Xiao Hong Zhou, Shenzhen (CN); Long Hui Niu, Shenzhen (CN)

(73) Assignee: Johnson Electric International AG, Murten (CH)

( * ) Notice: Subject to any disclaimer, the term of this patent is extended or adjusted under 35 U.S.C. 154(b) by 333 days.

(21) Appl. No.: 15/707,189

(22) Filed: Sep. 18, 2017

(65) Prior Publication Data

US 2018/0079446 A1    Mar. 22, 2018

(30) Foreign Application Priority Data

Sep. 18, 2016    (CN) .......................... 2016 1 0831291

(51) Int. Cl.
| | |
|---|---|
| *B62D 5/04* | (2006.01) |
| *H02P 25/22* | (2006.01) |
| *H02K 3/52* | (2006.01) |
| *H02P 4/00* | (2006.01) |
| *H02K 3/28* | (2006.01) |
| *H02K 16/04* | (2006.01) |

(52) U.S. Cl.
CPC ......... *B62D 5/0406* (2013.01); *B62D 5/0403* (2013.01); *H02K 3/522* (2013.01); *H02P 4/00* (2013.01); *H02P 25/22* (2013.01); *H02K 3/28* (2013.01); *H02K 16/04* (2013.01); *H02K 2203/03* (2013.01); *H02K 2213/06* (2013.01)

(58) Field of Classification Search
CPC .......... B62D 6/00; B62D 1/00; B62D 5/0406; B62D 5/0403; H02P 4/00; H02P 25/22; G06F 19/00; H02K 3/522; H02K 3/28; H02K 16/04; H02K 2203/03; H02K 2213/06
See application file for complete search history.

(56) References Cited

U.S. PATENT DOCUMENTS

| | | | |
|---|---|---|---|
| 2005/0159866 A1* | 7/2005 | Takeuchi ............... | B62D 5/003 701/41 |
| 2008/0115345 A1* | 5/2008 | Purvines ................. | H02K 3/47 29/596 |

(Continued)

*Primary Examiner* — Emily P Pham
(74) *Attorney, Agent, or Firm* — Muncy, Geissler, Olds & Lowe, P.C.

(57) ABSTRACT

A BLDC includes an outer casing, and a first sub-motor and a second sub-motor mounted within the outer casing. The BLDC further includes a terminal hub, and a first conductive terminal set and a second conductive terminal set. The first and second sub-motor include their respective stators that are energized independently and a common rotor. The first conductive terminal set is configured as a power supply branch circuit for the stator of the first sub-motor, the second conductive terminal set is configured as a power supply branch circuit for the stator of the second sub-motor. The first and second sub-motors can be configured to selectively commonly operate as a single motor to output normal power or operate independently. When one sub-motor fails, the other sub-motor can independently operate to ensure reliability and safety of the motor.

19 Claims, 14 Drawing Sheets

(56) References Cited

U.S. PATENT DOCUMENTS

| | | | |
|---|---|---|---|
| 2009/0128076 A1* | 5/2009 | Taniguchi | H02P 25/22 318/400.41 |
| 2009/0133956 A1* | 5/2009 | Itoh | B62D 5/0403 180/446 |
| 2010/0096943 A1* | 4/2010 | Yamaguchi | H02K 3/28 310/195 |
| 2013/0214630 A1* | 8/2013 | Ombach | H02K 3/28 310/152 |
| 2014/0084728 A1* | 3/2014 | Iwasaki | H02K 3/00 310/156.01 |
| 2014/0207335 A1* | 7/2014 | Mikamo | B62D 5/046 701/41 |
| 2016/0149476 A1* | 5/2016 | Qin | B62D 5/0421 180/443 |
| 2016/0164447 A1* | 6/2016 | Wu | H02P 29/032 180/443 |
| 2016/0218578 A1* | 7/2016 | Yamada | H02K 3/522 |
| 2016/0294240 A1* | 10/2016 | Kawamoto | H02K 3/325 |
| 2017/0133905 A1* | 5/2017 | Nakamura | H02K 29/12 |

* cited by examiner

BRUSHLESS DIRECT CURRENT MOTOR AND ELECTRIC POWER STEERING SYSTEM COMPRISING SAME

CROSS REFERENCE TO RELATED APPLICATIONS

This non-provisional patent application claims priority under 35 U.S.C. § 119(a) from Patent Application No.201610831291.8 filed in The People's Republic of China on Sep. 18, 2016.

FIELD OF THE INVENTION

The present invention relates to the field of motors, and in particular to a brushless direct current motor and an electric power steering system using the brushless direct current motor.

BACKGROUND OF THE INVENTION

The application of brushless direct current (BLDC) motors in electric power steering systems, such as in car steering systems, makes it possible for a driver to produce a larger torque with less force, which greatly reduces the operator's strength. However, conventional brushless direct current motors generally include a stator with windings, a rotor having a permanent magnet, and a controller for supplying power to the stator. The stator usually includes a stator core with the windings wound therearound. The windings include m-phase windings, each phase winding having a plurality of parallel branch circuits. When one of the branch circuits of the windings breaks, it causes unbalance between the breaking winding and the other phases of windings, thus resulting in large fluctuation of motor torque and motor vibration. Especially when the BLDC motor of the steering wheel electric power steering system fails, if the driver rotates the steering wheel, it may cause short-circuit of winding coils and produce a short-circuit current and, as a result, a braking torque is produced, which prevents rotation of the steering wheel. Therefore, the conventional BLDC motor has serious safety concerns.

SUMMARY OF THE INVENTION

Thus, there is a desire for a motor which is capable of steady torque output.

There is also a desire for an electric power steering system that employs the motor.

A brushless direct current motor comprises an outer casing, and a first sub-motor and a second sub-motor mounted within the outer casing. The brushless direct current motor further comprises a terminal hub, and a first conductive terminal set and a second conductive terminal set disposed on the terminal hub. The first sub-motor and the second sub-motor comprise their respective stators that are energized independently and a common rotor. The first conductive terminal set is configured as a power supply branch circuit for the stator of the first sub-motor, and the second conductive terminal set is configured as a power supply branch circuit for the stator of the second sub-motor. The first sub-motor and the second sub-motor can be configured to selectively commonly operate as a single motor to output normal power or operate independently.

Preferably, the stator of the first sub-motor and the stator of the second sub-motor comprise the same number of stator teeth, and the stator teeth of the first sub-motor and the stator teeth of the second sub-motor are symmetrically distributed about a diameter of the brushless direct current motor.

Preferably, the first conductive terminal set and the second conductive terminal set do not overlap along a circumferential direction.

Preferably, the first conductive terminal set and the second conductive terminal set are symmetrically arranged.

Preferably, the brushless direct current motor is a two-phase motor, its number of polarities of the rotor Np and number of slots of the stator Ns are both even numbers and satisfy the following equation:

$$\frac{Np}{Ns} = k - \frac{1}{2}, k = 1, 2, 3 \ldots .$$

Preferably, wherein the brushless direct current motor is a three-phase motor, its number of polarities of the rotor Np and number of slots of the stator Ns satisfy the following equation:

$$\frac{Np}{Ns} \neq \frac{1}{4}k, k = 1, 2, 3 \ldots ,$$

where Np is an even number, and Ns=6k, k=1,2,3 . . . .

Preferably, each of the first sub-motor and the second sub-motor includes six stator teeth, the stator teeth of the first sub-motor sequentially connect to form a substantially semi-circular shape, the stator teeth of the second sub-motor sequentially connect to form a substantially semi-circular shape, and the stator teeth of the first sub-motor and the stator teeth of the second sub-motor are symmetrically arranged.

Preferably, the terminal hub and the two conductive terminal sets are integrally formed through injection molding.

Preferably, each of the first sub-motor and the second sub-motor includes U-phase teeth, V-phase teeth and W-phase teeth, the first conductive terminal set connects the U-phase teeth, V-phase teeth and W-phase teeth of the first sub-motor to an external power source, and the second conductive terminal set connects the U-phase teeth, V-phase teeth and W-phase teeth of the second sub-motor to an external power source.

Preferably, each conductive terminal set includes a plurality of electrically conductive elements sequentially arranged along an axial direction of the motor and insulated from each other.

Preferably, each electrically conductive element comprises at least one electrically conductive tab, a plurality of accommodating portions is disposed at a circumferential side of the terminal hub, each electrically conductive tab is accommodated in a corresponding one of the accommodating portions, each sub-motor comprises winding coils, and each connection end of the winding coils is electrically connected to one corresponding electrically conductive tab.

Preferably, the terminal hub comprises a plurality of isolating portions such that adjacent connection ends are insulated from each other.

Preferably, the brushless direct current motor further comprises a plurality of bobbins, each bobbin comprises an upper bobbin and a lower bobbin, and the upper bobbin and the lower bobbin are attached to opposite ends of the stator teeth, respectively.

Preferably, the first sub-motor and the second sub-motor are controlled by a single controller.

Preferably, the first sub-motor and the second sub-motor are controlled by two controllers, respectively, currents of the two sub-motors have a phase difference such that n-order harmonic of torque of the second sub-motor has a shift of $(2k+1)/2$ cycles relative to n-order harmonic of torque of the first sub-motor, where $k=0,\pm1,\pm2,\pm3\ldots$.

An electric power steering system comprises a steering wheel, a steering column fixedly connected with the steering wheel, a steering gear fixedly connected with the steering column, and a motor drivingly connected with the steering gear. The motor is a brushless direct current motor as described above.

Figure 1:
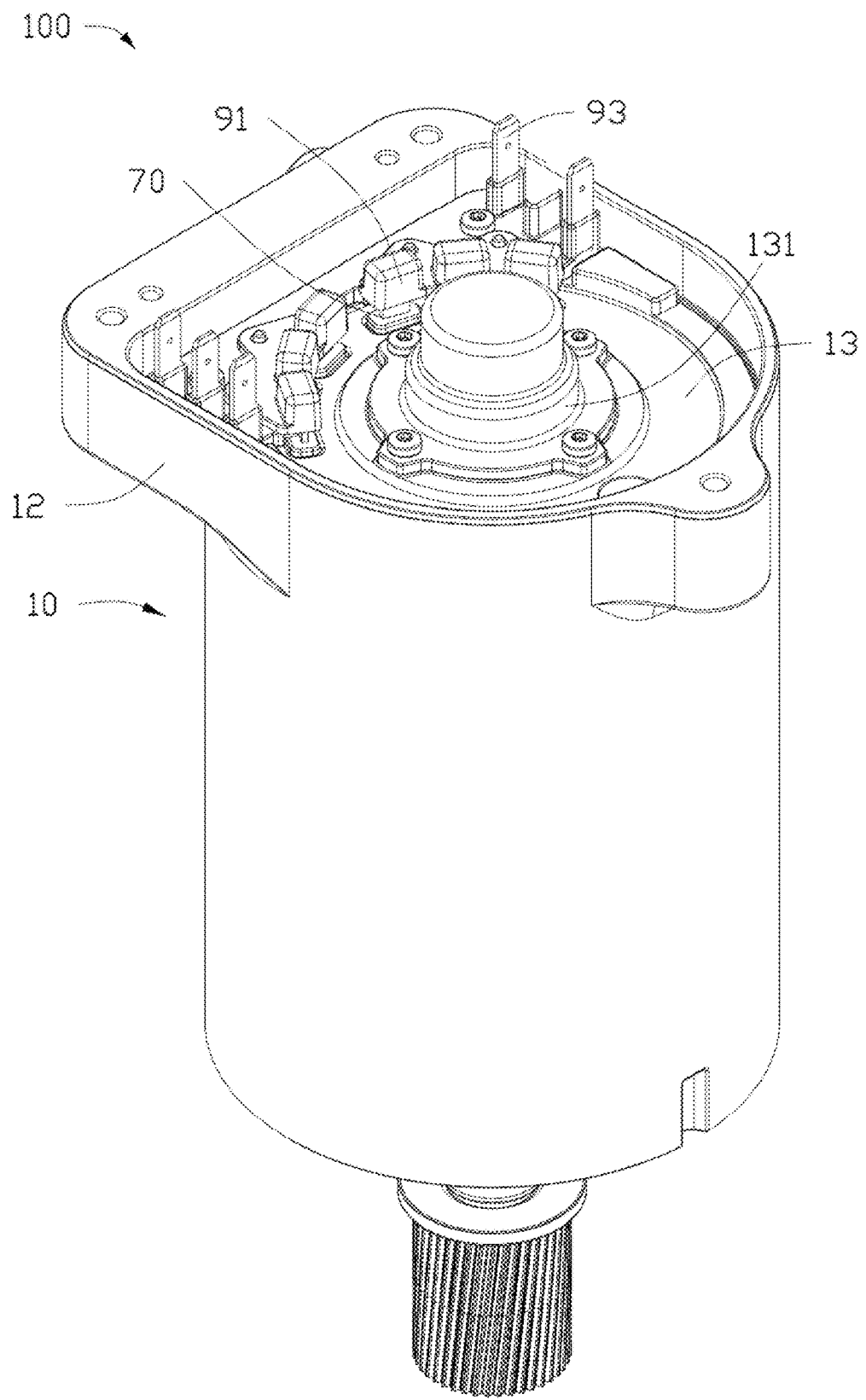
FIG. 1 is a perspective view of a BLDC motor according to one embodiment of the present invention.

The present invention will be further described below with reference to the accompanying drawings and the following embodiments.

DETAILED DESCRIPTION OF THE PREFERRED EMBODIMENTS

Below, embodiments of the present invention will be described in greater detail with reference to the drawings. Elements of similar structures or functions are generally represented by like reference numerals for illustrative purposes throughout the figures. It should be noted that the figures are illustrative rather than limiting. The figures are not drawn to scale, do not illustrate every aspect of the described embodiments, and do not limit the scope of the present disclosure. Unless otherwise specified, all technical and scientific terms used in this disclosure have the ordinary meaning as commonly understood by people skilled in the art.

It is noted that, when a component is described to be "fixed" to another component, it can be directly fixed to the another component or there may be an intermediate component. When a component is described to be "connected" to another component, it can be directly connected to the another component or there may be an intermediate component. When a component is described to be "disposed" on another component, it can be directly disposed on the another component or there may be an intermediate component.

Figure 2:
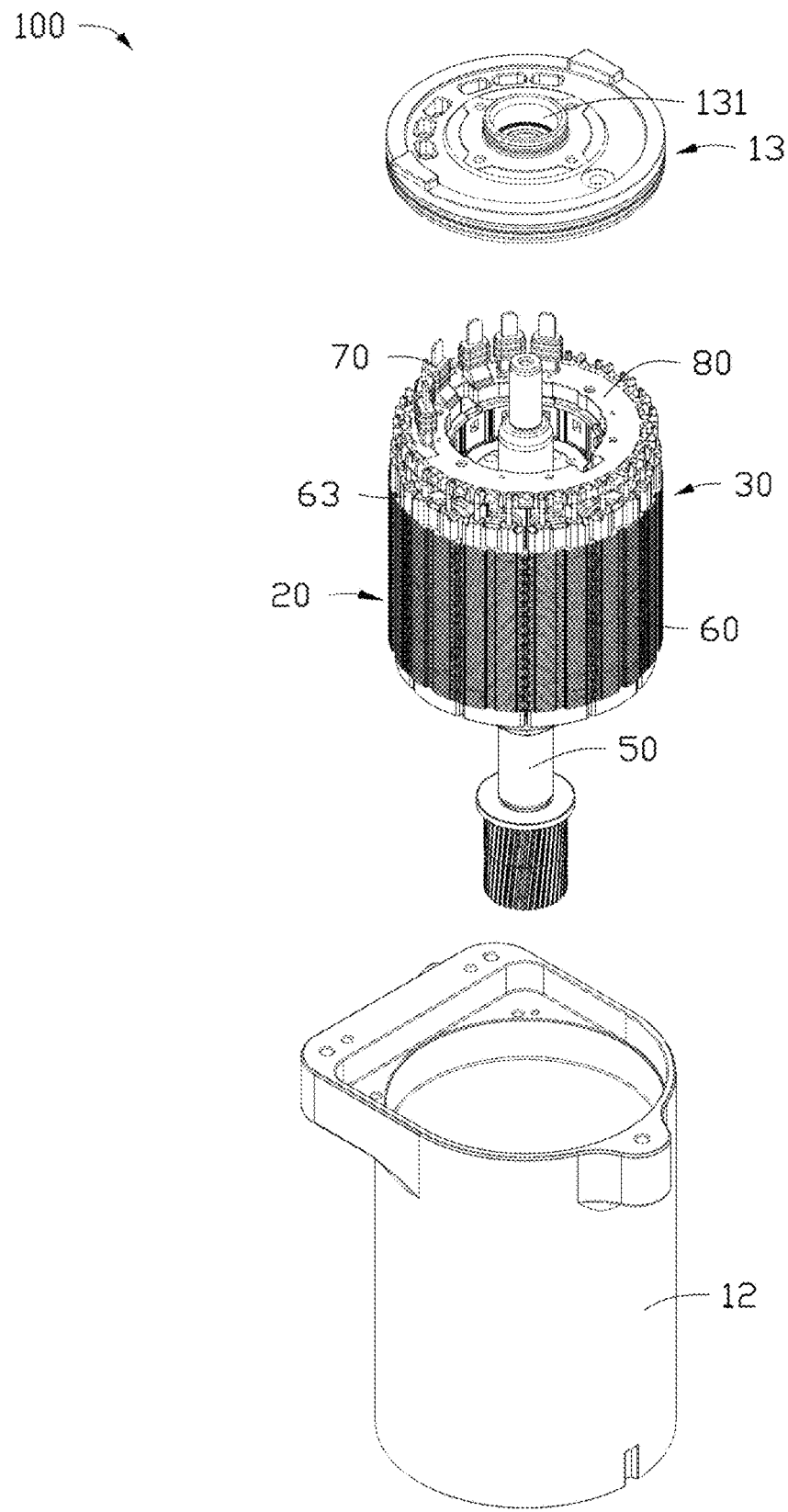
FIG. 2 is an exploded view of the BLDC motor of FIG. 1.

Referring to FIG. 1 and FIG. 2, a brushless direct current (BLDC) motor 100 in accordance with one embodiment of the present invention includes an outer casing 10, a first sub-motor 20 and a second sub-motor 30 mounted within the outer casing 10, and a single rotor 50 commonly used by the first sub-motor 20 and the second sub-motor 30. The BLDC motor 100 further includes stators 60 mounted within the outer casing 10 and supplying power respectively to the first sub-motor 20 and the second sub-motor 30, two conductive terminal sets 70, and a terminal hub 80 covering the conductive terminal sets 70. In this embodiment, the two conductive terminal sets 70 include a first conductive terminal set for supplying power to the stator 60 of the first sub-motor 20 and a second conductive terminal set for supplying power to the stator 60 of the second sub-motor 30.

The outer casing 10 includes a housing 12 for mounting the stator 60 and a cover body 13 for supporting the rotor 50. The cover body 13 includes a bearing seat 131 with at least one bearing (not shown) received therein for supporting the rotor 50. The cover body 13 covers one end of the housing 12.

Figure 4:
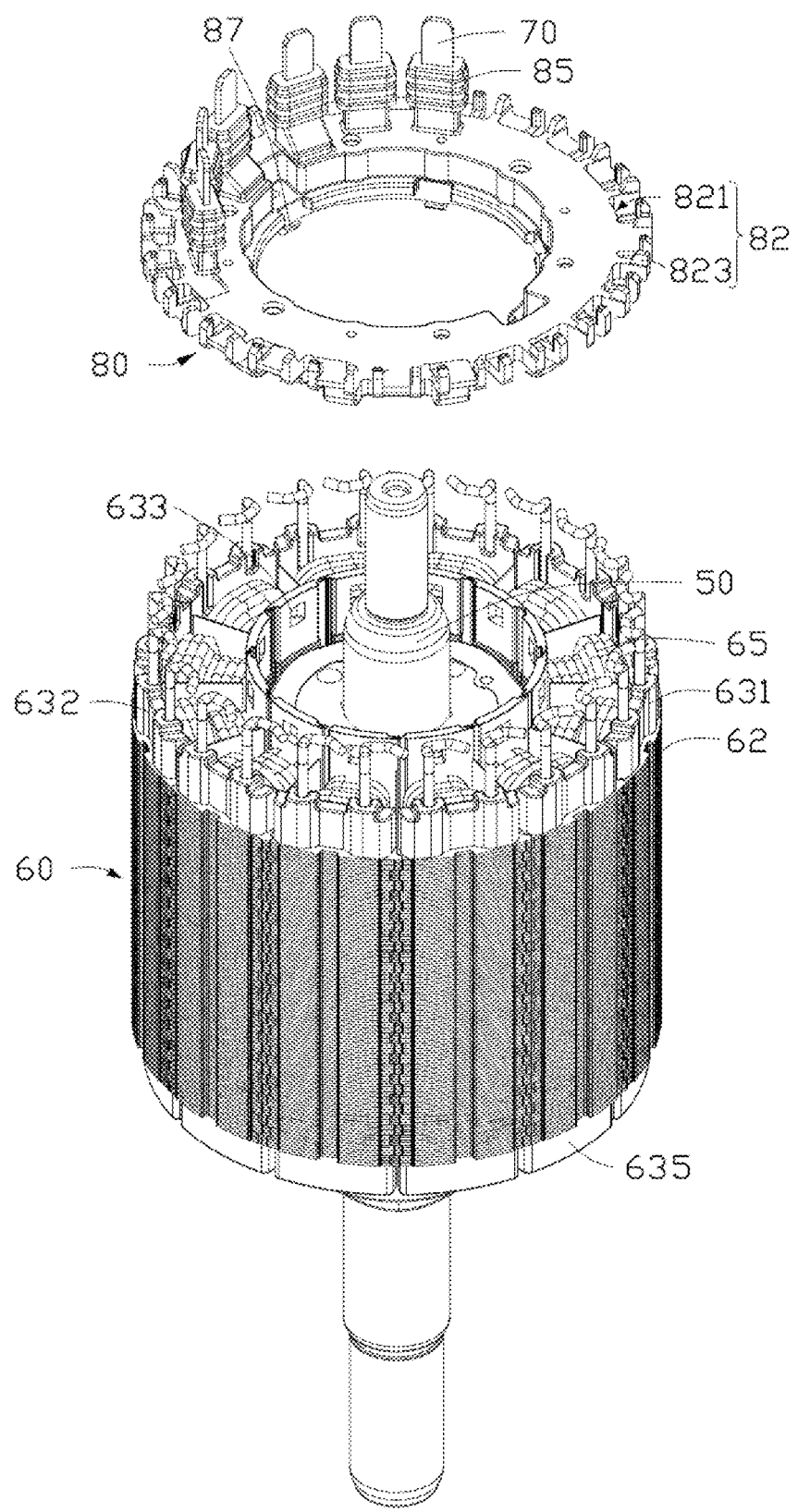
FIG. 4 is a partially exploded view of a rotor, stator and terminal hub of the BLDC motor of FIG. 1.
Figure 5:
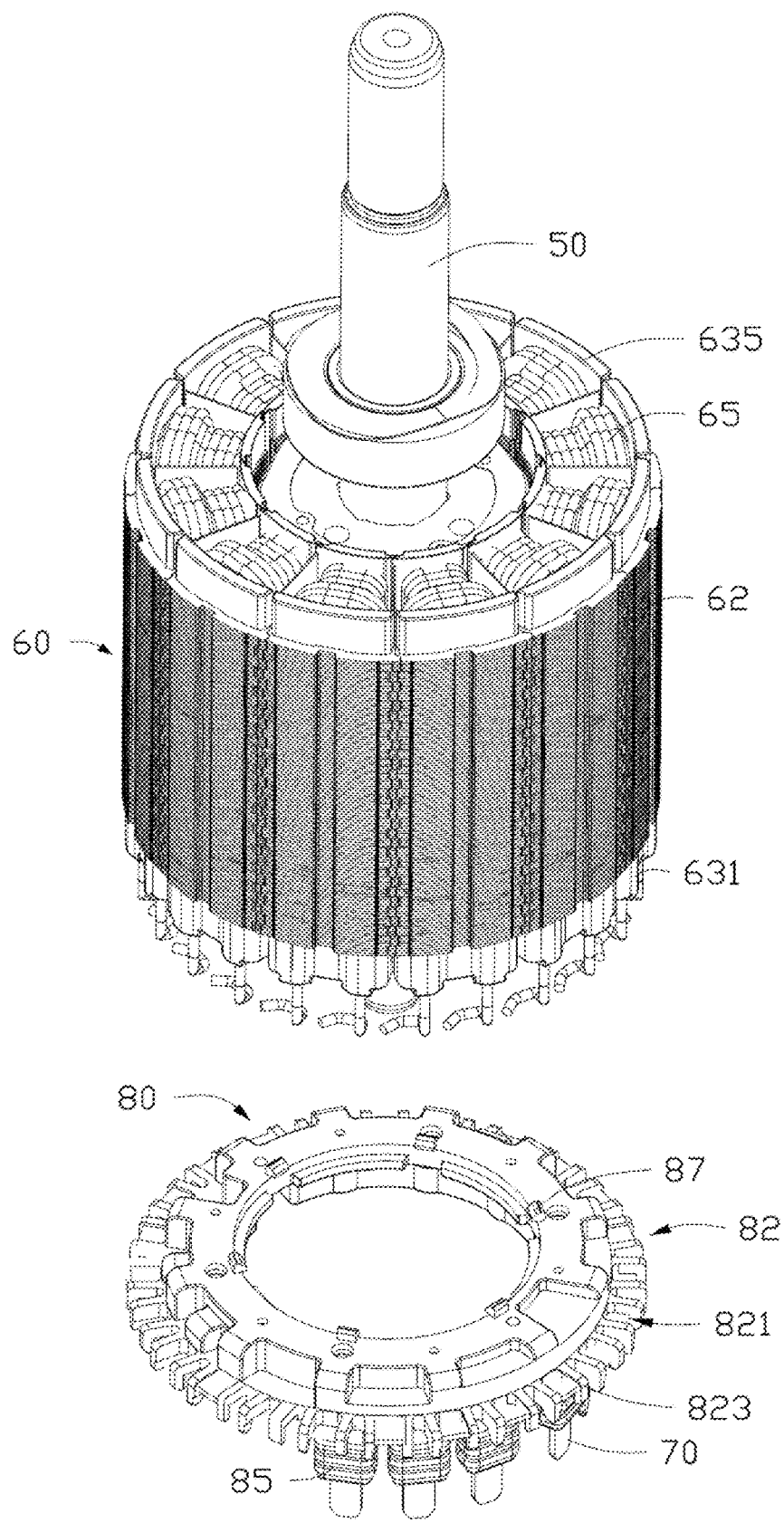
FIG. 5 is a partially exploded view of the rotor, stator and terminal hub of the BLDC motor of FIG. 4, viewed from another aspect.

Referring to FIG. 2, FIG. 4 and FIG. 5, each of the first sub-motor 20 and the second sub-motor 40 of the first embodiment is a three-phase motor. The stators 60 of the two sub-motors have the same number of stator teeth 62. In this embodiment, the number of stator teeth of the stator 60 of each sub-motor is six. The stator teeth 62 of the first sub-motor 20 and the stator teeth 62 of the second sub-motor 30 are symmetrically distributed about a diameter of the BLDC motor 100. The first sub-motor 20 and the second sub-motor 30 each include a plurality of bobbins 63 mounted around the stator teeth 62 and winding coils 65 wound around the bobbins 63.

The stator teeth 62 and the winding coils 65 respectively form U-phase, V-phase and W-phase teeth of the first sub-motor 20 and second sub-motor 30 and their respective coils. The first sub-motor 20 includes six stator teeth 62, wherein the number of the U-phase teeth, the number of the V-phase teeth and the number of the W-phase teeth are each two. The second sub-motor 40 includes six stator teeth 62, wherein the number of the U-phase teeth, the number of the V-phase teeth and the number of the W-phase teeth are each two. The number of slots of the stator 60 of the BLDC motor is twelve. The first conductive terminal set connects the U-phase teeth, the V-phase teeth and the W-phase teeth of the first sub-motor 20 to an external power source, and the second conductive terminal set connects the U-phase teeth, the V-phase teeth and the W-phase teeth of the second sub-motor 30 to an external power source.

Figure 3:
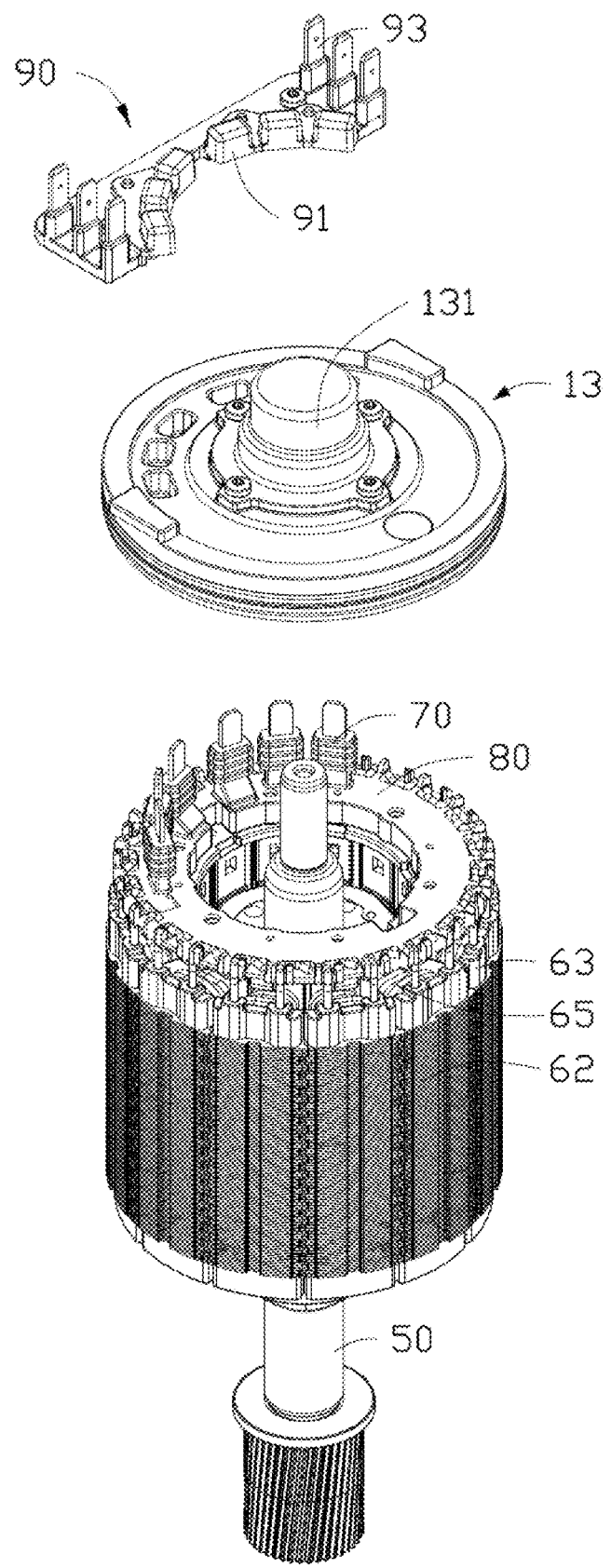
FIG. 3 is a partially exploded view of the BLDC motor of FIG. 1.
Figure 9:
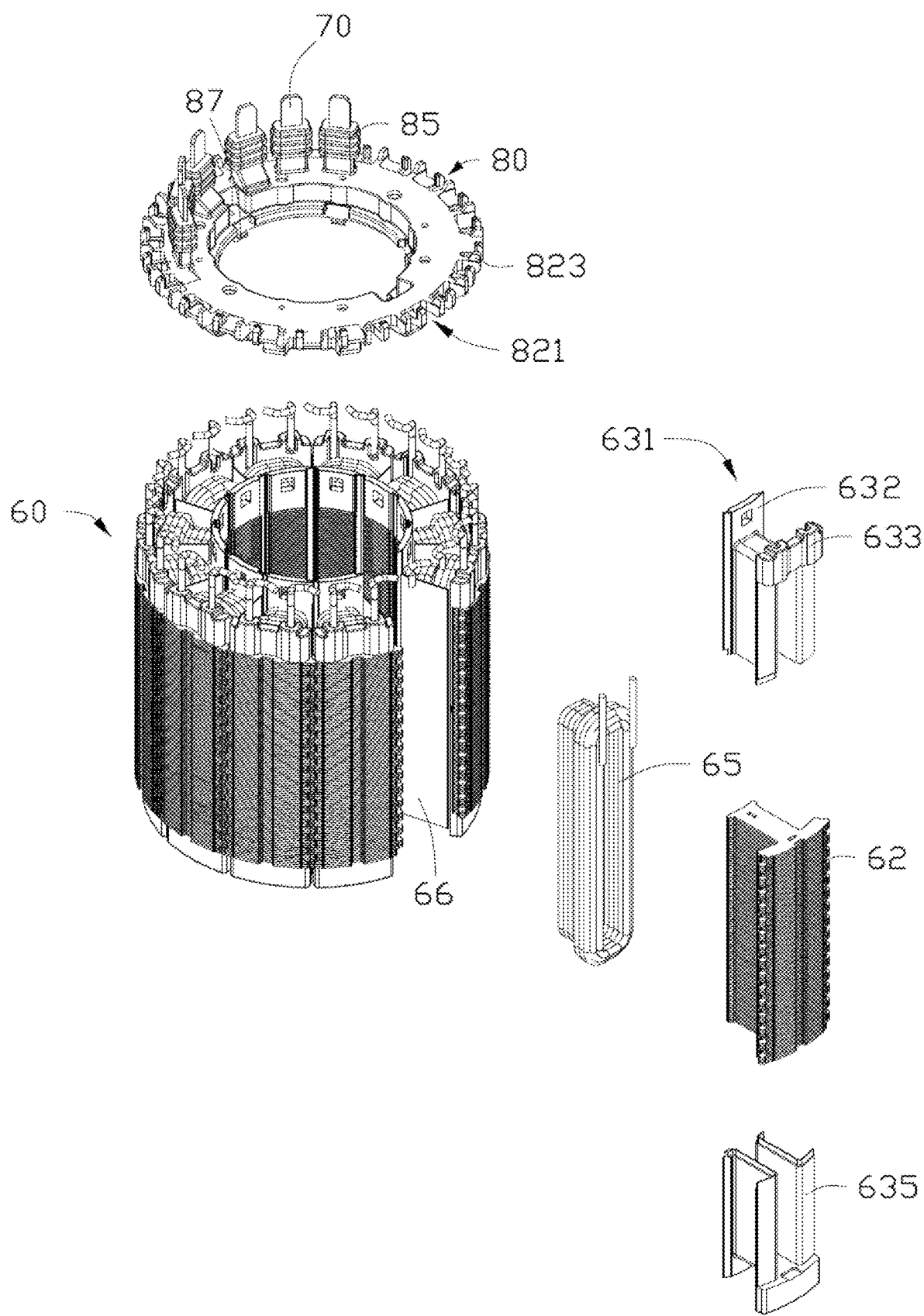
FIG. 9 is a further exploded view of the rotor, stator and terminal hub of FIG. 4.

Referring to FIG. 3, FIG. 4, and FIG. 9, each bobbin 63 is attached around a corresponding one of the stator teeth 62. Each bobbin 63 includes an upper bobbin body 631 and a lower bobbin body 635 respectively attached around opposite ends of the corresponding stator tooth 62. In this embodiment, the stator teeth 62 are formed by sequentially stacking magnetic conductive materials such as a plurality of silicon steel sheets. A positioning portion 632 and a locking portion 633 are formed on an end of the upper bobbin body 631 away from one corresponding lower bobbin body 635. In this embodiment, the positioning portion 632 defines two through holes (not labeled) for allowing one corresponding winding coil 65 to pass therethrough. A plurality of latch portions 87 (see FIG. 5) is disposed at one side of the terminal hub 80. The locking portion 633 of each upper bobbin body 631 is engaged with one corresponding latch portion 87 to retain the terminal hub 80 at one end of the stator 60.

It should be understood that the engagement between the latch portion 87 and the locking portion 633 may be implemented as an engagement between a hook and a locking slot.

Each winding coil 65 is wound around an outer side of the bobbin 63. Two connection ends of the winding coil 65 pass through the through holes, respectively, to avoid short-circuit of the two connection ends.

Referring to FIG. 9, each stator tooth 62 is connected with one another such that the stator teeth 62 are arranged into a hollow cylindrical body. The rotor 50 is rotatably disposed within the stator 60. Insulating layers 66 are disposed on opposing portions of two adjacent stator teeth 62 to avoid short-circuit of the winding coils 65 of the two adjacent stator teeth 62.

Figure 10:
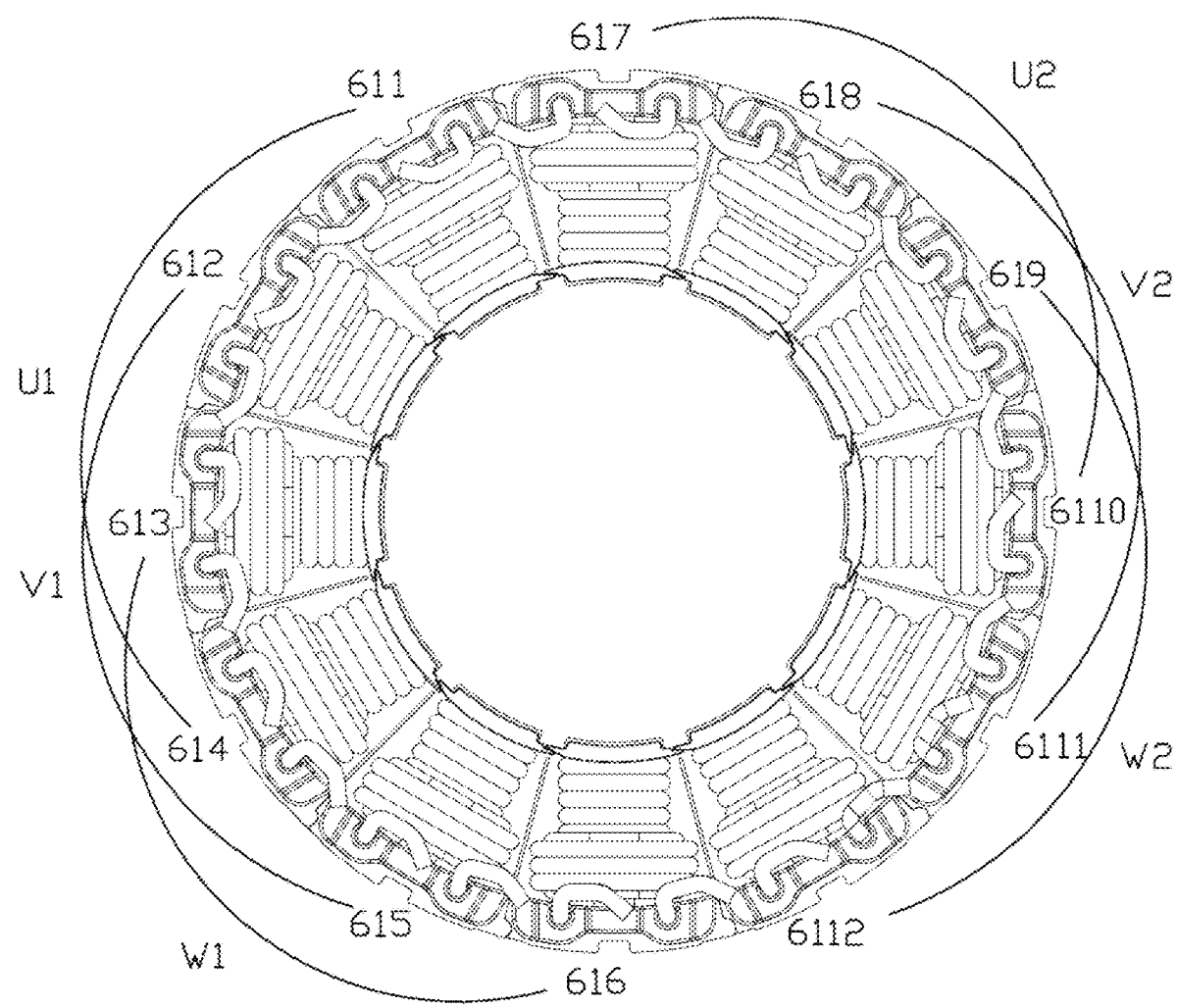
FIG. 10 is a top view of the stator of FIG. 1.

Referring also to FIG. 9 and FIG. 10, in this embodiment, the stator teeth 62 of the first sub-motor 20 are arranged with each adjacent one other along a circumferential direction to form a semi-circular shape, and the stator teeth 62 of the second sub-motor 30 are arranged with each being adjacent one another along the circumferential direction to form a semi-circular shape. The first sub-motor 20 and the second sub-motor 30 form two symmetrical halves of the BLDC motor 100.

Figure 6:
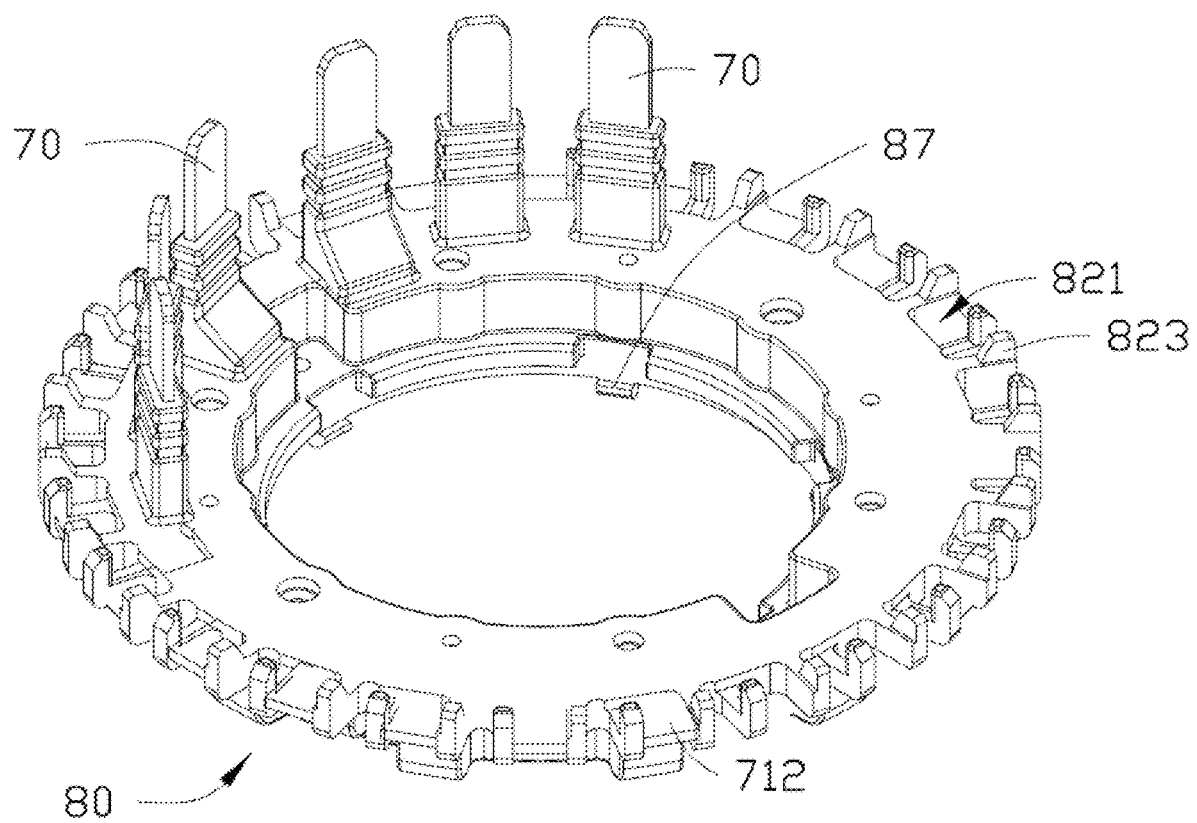
FIG. 6 is an assembled view of the terminal hub of FIG. 5.
Figure 7:
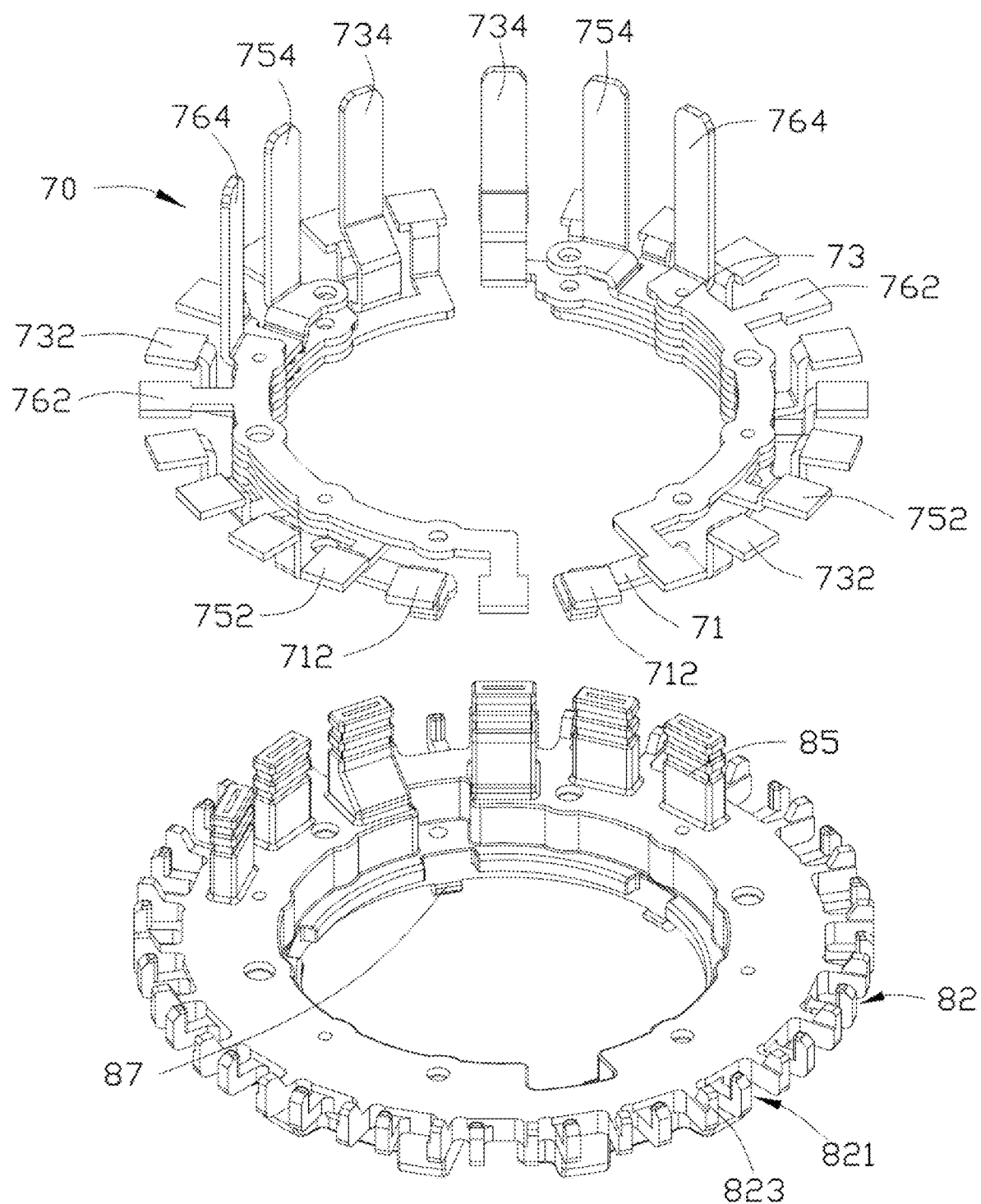
FIG. 7 is an exploded view of the terminal hub of FIG. 6.
Figure 8:
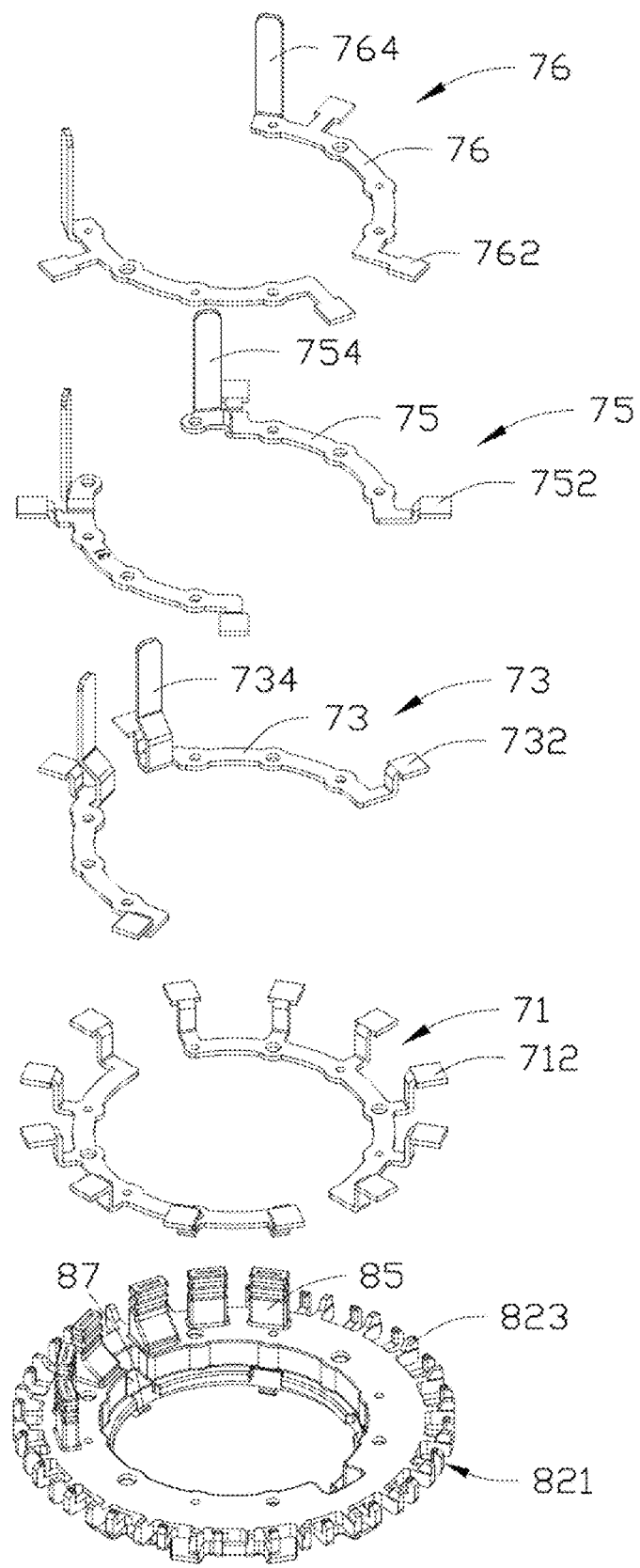
FIG. 8 is a further exploded view of the terminal hub of FIG. 7.

Referring to FIG. 6 through FIG. 8, each conductive terminal set 70 includes a plurality of electrically conductive elements sequentially arranged along an axial direction of the BLDC motor 100 and insulated from each other. In particular, each conductive terminal set 70 includes a first electrically conductive element 71, a second electrically conductive element 73, a third electrically conductive element 75 and a fourth electrically conductive element 76. The first electrically conductive element 71 forms a star point of Y-connection of the corresponding sub-motor 20 or 30. In this embodiment, each first electrically conductive element 71 includes six electrically conductive tabs 712. Each electrically conductive tab 712 is electrically connected to one connection end of one corresponding wire coil 65 of one of the sub-motor 20 or sub-motor 30. The second electrically conductive element 73, the third electrically conductive element 75 and the fourth electrically conductive element 76 are respectively connected to the connection ends of the winding coils 65 of the U-phase teeth, V-phase teeth and W-phase teeth of the one of the sub-motor 20 and sub-motor 30. In particular, the second electrically conductive element 73 includes two electrically conductive tabs 732 and one power supply terminal 734. The two electrically conductive tabs 732 are electrically connected to the other connection ends of the winding coils 65 of the two U-phase teeth, and the power supply terminal 734 passes through the terminal hub 80 so as to connect to the external power source. Similarly, the third electrically conductive element 75 includes two electrically conductive tabs 752 and one power supply terminal 754, and the fourth electrically conductive element 76 includes two electrically conductive tabs 762 and one power supply terminal 764. The two electrically conductive tabs 752, 762 are respectively connected to the corresponding connection ends of the winding coils 65 of the two V-phase teeth and two W-phase teeth, and the power supply terminals 754, 764 pass through the terminal hub 80 so as to connect to the external power source. In this embodiment, the first electrically conductive element 71, which acts as the star point of the Y-connection, is located at one side of the conductive terminal set 70 adjacent the stator 60.

In this embodiment, the first conductive terminal set and the second conductive terminal set do not overlap along the circumferential direction. That is, when viewed in the axial direction of the BLDC motor 100, the first conductive terminal set and the second conductive terminal set are spaced apart from each other and share no overlapped portions in the circumferential direction. Because the first conductive terminal set and the second conductive terminal set do not overlap in the circumferential direction, the two conductive terminal sets are insulated from each other. Even in case of a short-circuit, the short-circuit occurs only in the interiors of the conductive terminal sets 70, and there is no short-circuit occurring between the two conductive terminal sets 70 to cause failure of both sub-motors at the same time. Therefore, in the motor of the present invention, one short-circuited sub-motor can be prevented from affecting the normal operation of the other sub-motor, thus improving the reliability of the motor.

Referring to FIG. 7, a plurality of fixing portions 85 is disposed at one side of the terminal hub 80. Each power supply terminal passes through and is fixed in a corresponding one of the fixing portions 85. The BLDC motor 100 further includes an adapter 90 (FIG. 3). The adapter 90 is mounted to the side of the terminal hub 80 where the fixing portions 85 are disposed, and is configured to electrically connect the power supply terminals to the external power source. The adapter 90 includes a plurality of end portions 91 and a plurality of inserting tabs 93. Each end portion 91 is electrically connected to a corresponding one of the inserting tabs 93. The end portion 91 is in the form of a cover, and each end portion 91 covers one end of a corresponding one of the power supply terminals 734, 754, and 764. The end portions 91 are arranged corresponding to the power supply terminals 734, 754, and 764. In this embodiment, the inserting tabs 93 are divided into two groups that are disposed on the adapter 90 and oppose to each other, and each group of inserting tabs 93 corresponds to the U-phase, V-phase and W-phase of a corresponding one of the sub-motor 20 and sub-motor 30.

In this embodiment, the terminal hub 80 is a hollow annular structure. The first electrically conductive element 71, the second electrically conductive element 73, the third electrically conductive element 75 and the fourth electrically conductive element 76 of the conductive terminal set 70 are stacked sequentially along the axial direction of the BLDC motor 100, thereby forming a substantially semi-circular structure. The two conductive terminal sets 70 are symmetrically disposed within the terminal hub 80. In this embodiment, the terminal hub 80 is formed through injection molding around the two conductive terminal sets 70. The first electrically conductive element 71, the second electrically conductive element 73, the third electrically conductive element 75 and the fourth electrically conductive element 76 of one same conductive terminal set 70 are insulated from each other, and the two conductive terminal sets 70 are also insulated from each other.

A plurality of accommodating portions 82 is disposed along a circumferential side of the terminal hub 80. Each accommodating portion 82 defines an opening 821 for accommodating a corresponding one of the electrically conductive tabs 712, 732, 752 and 762. Each accommodating portion 82 bends in a direction away from the latch portion 87 to form at least one isolating portion 823. The isolating portion 823 allows one connection end of one of the winding coils 65 to be wound thereon. The connection end of the winding coil 65 passes through the through hole of the positioning portion 632, passes over the isolating portion 823, and connects to one corresponding electrically conductive tab. In this embodiment, the connection end is connected to the electrically conductive tab by soldering. The isolating portion 823 avoids short-circuit between two adjacent circuits.

Figure 11A:
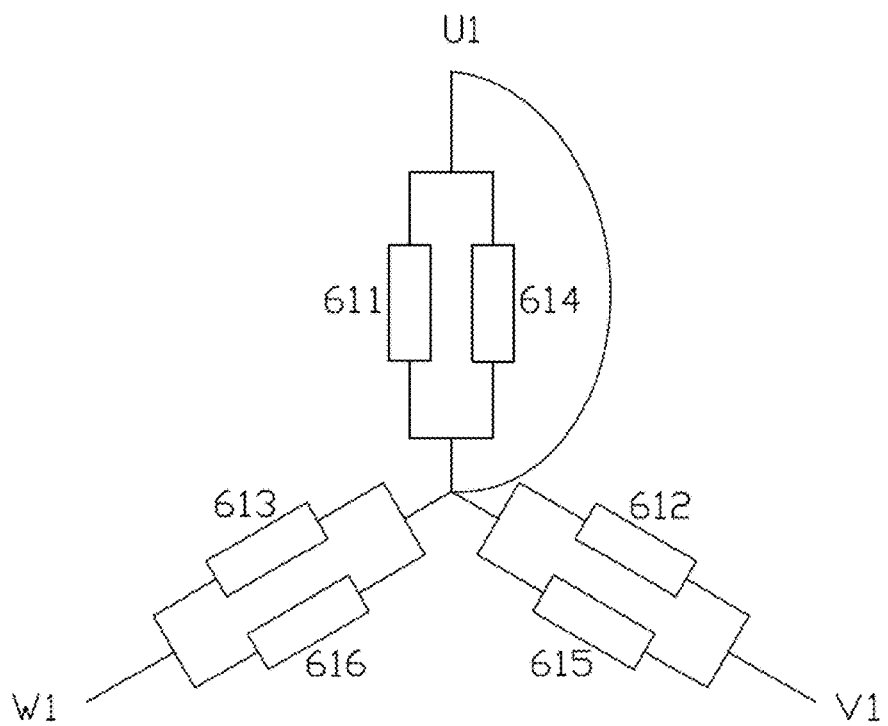
FIG. 11A and FIG. 11B are winding connection circuits of the first sub-motor and second sub-motor of the BLDC motor of FIG. 1, respectively.
Figure 11B:
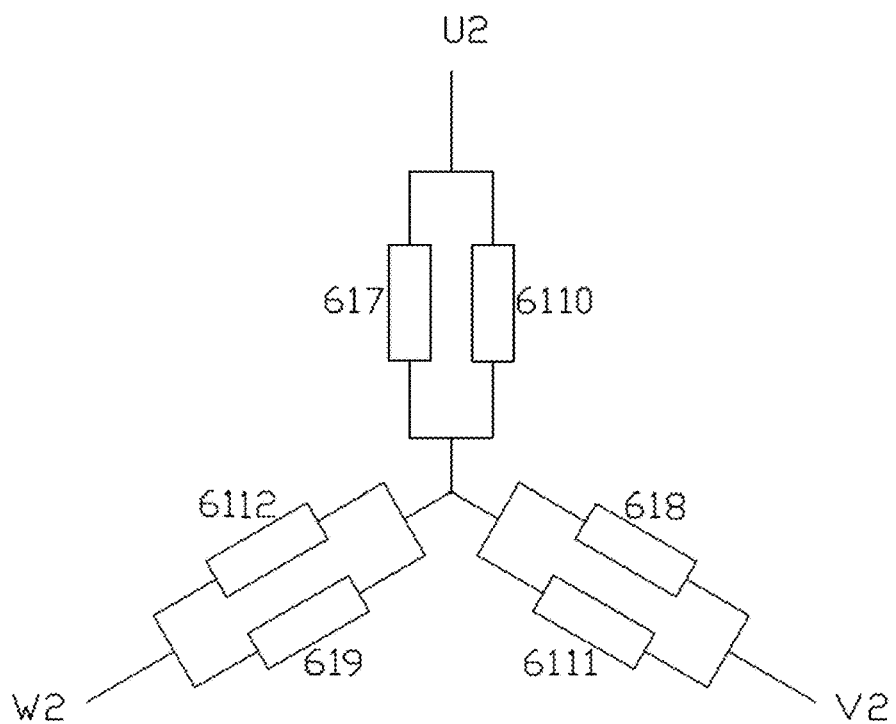

Referring to FIG. 10 and FIG. 11, for ease of illustration, the stator teeth 62 of the first sub-motor 20 are denoted by reference numerals 611 to 616, respectively, U1, V1, W1 are used to denote respectively three input terminals of the first sub-motor 20, the stator teeth 62 of the second sub-motor 30 are denoted by reference numerals 617 to 6112, respectively, and U2, V2, W2 are used to denote respectively three input terminals of the first sub-motor 30. FIG. 11A and FIG. 11B illustrate winding connection circuit of the first sub-motor 20 and the second sub-motor 30, respectively.

Figure 13:
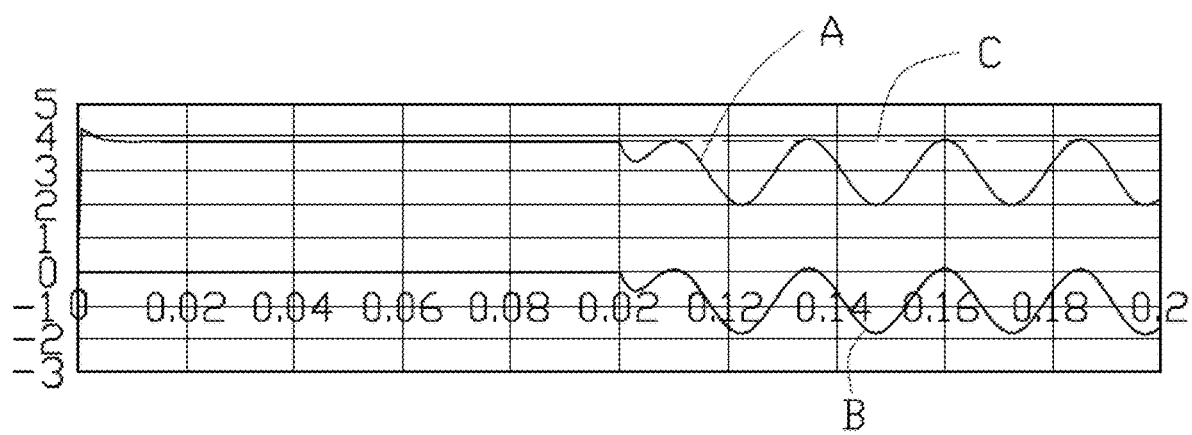
FIG. 13 is a diagram of the short-circuit torque curve of the BLDC motor of FIG. 1.

FIG. 13 is a diagram showing the torque of a conventional motor and the BLDC motor 100 of the present invention in case of a winding short-circuit. The curve A in the figure represents the short-circuit torque of the conventional motor, while curve B and curve C represent respectively the torque of the first sub-motor 20 and the torque of the second sub-motor 30 in case of the short-circuit of the first sub-motor 20. As can be seen, in case of the short-circuit, the output torque of the conventional motor and the first sub-motor 20 fluctuates obviously. The BLDC motor 100 of the present invention further includes the second sub-motor 30 that operates normally. Therefore, even the short-circuit occurs in one of the sub-motor 20 and sub-motor 30, the other of the sub-motor 20 and sub-motor 30 can still output normal torque.

Figure 12A:
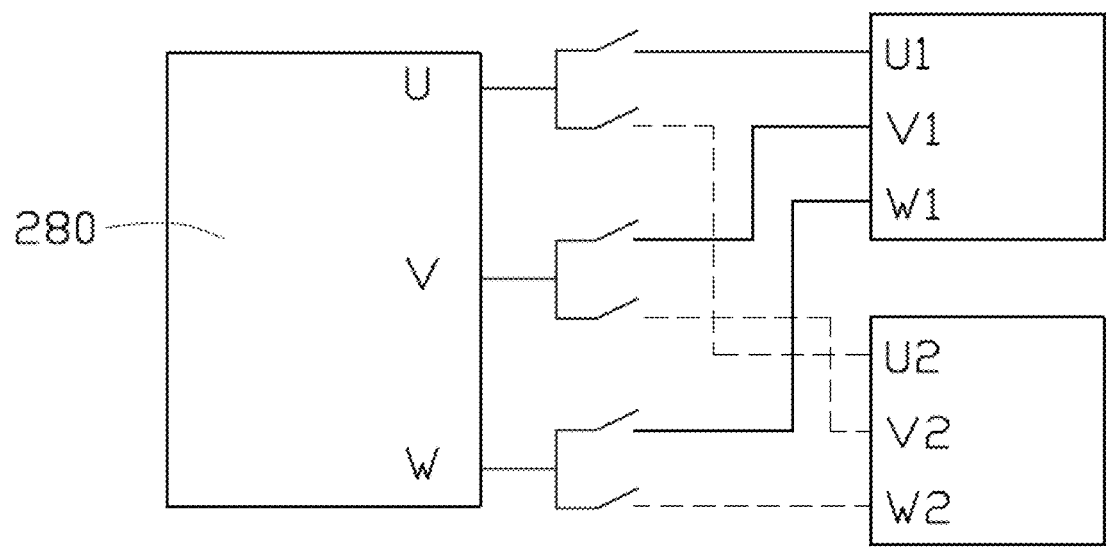
FIG. 12A and FIG. 12B each illustrate a control of the controller of the BLDC motor of FIG. 1.
Figure 12B:
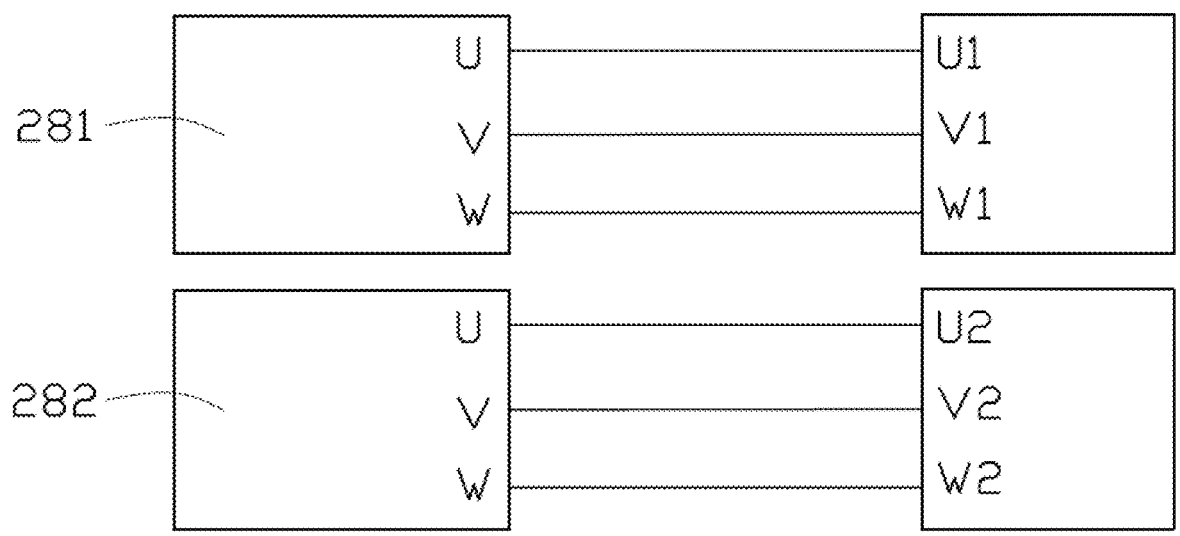

Referring to FIG. 12A and FIG. 12B, the first sub-motor 20 and the second sub-motor 30 of the BLDC motor of the present invention may be controlled by a single controller 280 (FIG. 12A). In this case, each output terminal of the controller 280 is connected with a corresponding one of the input terminals U1, V1, W1 of the first sub-motor 20 and a corresponding one of the input terminals U2, V2, W2 of the second sub-motor 30 through two switches (not labeled). Alternatively, the first sub-motor 20 and the second sub-motor 30 of the BLDC motor 10 may also be controlled by two controllers 281, 282, respectively (FIG. 12B). In this case, the output terminals of each controller 281, 282 are connected to corresponding ones of the input terminals U1, V1, W1 or U2, V2, W2 of the sub-motor 20 or sub-motor 30. When the first sub-motor 20 and the second sub-motor 30 are controlled respectively by two controllers 281, 282, it can be controlled such that currents of the two sub-motors 20 and 30 have a phase difference of (2k+1)/2 cycles (k=0,±1, ±2,±3 . . . ), and back EMFs of the two sub-motors 20 and 30 have the same phase, thereby improving n-order harmonic of a synthesized torque of the two sub-motors 20 and 30 and hence making operation of the motor smoother.

While in the above embodiment the BLDC motor is illustrated as a three-phase motor, the BLDC motor can be implemented as any motor as long as the following conditions are satisfied.

For a two-phase motor, the following equation needs to be satisfied:

$$\frac{Np}{Ns} = k - \frac{1}{2}, k = 1, 2, 3 \ldots ,$$

where Np is the number of polarities of the rotor, Ns is the number of slots of the stator, and Np and Ns are both even numbers.

For a three-phase motor, the following equation needs to be satisfied:

$$\frac{Np}{Ns} \neq \frac{1}{4}k, k = 1, 2, 3 \ldots ,$$

where Np is the number of polarities of the rotor, which is an even number, and Ns is the number of slots of the stator, where Ns=6k, k=1,2,3 . . . .

Figure 14:
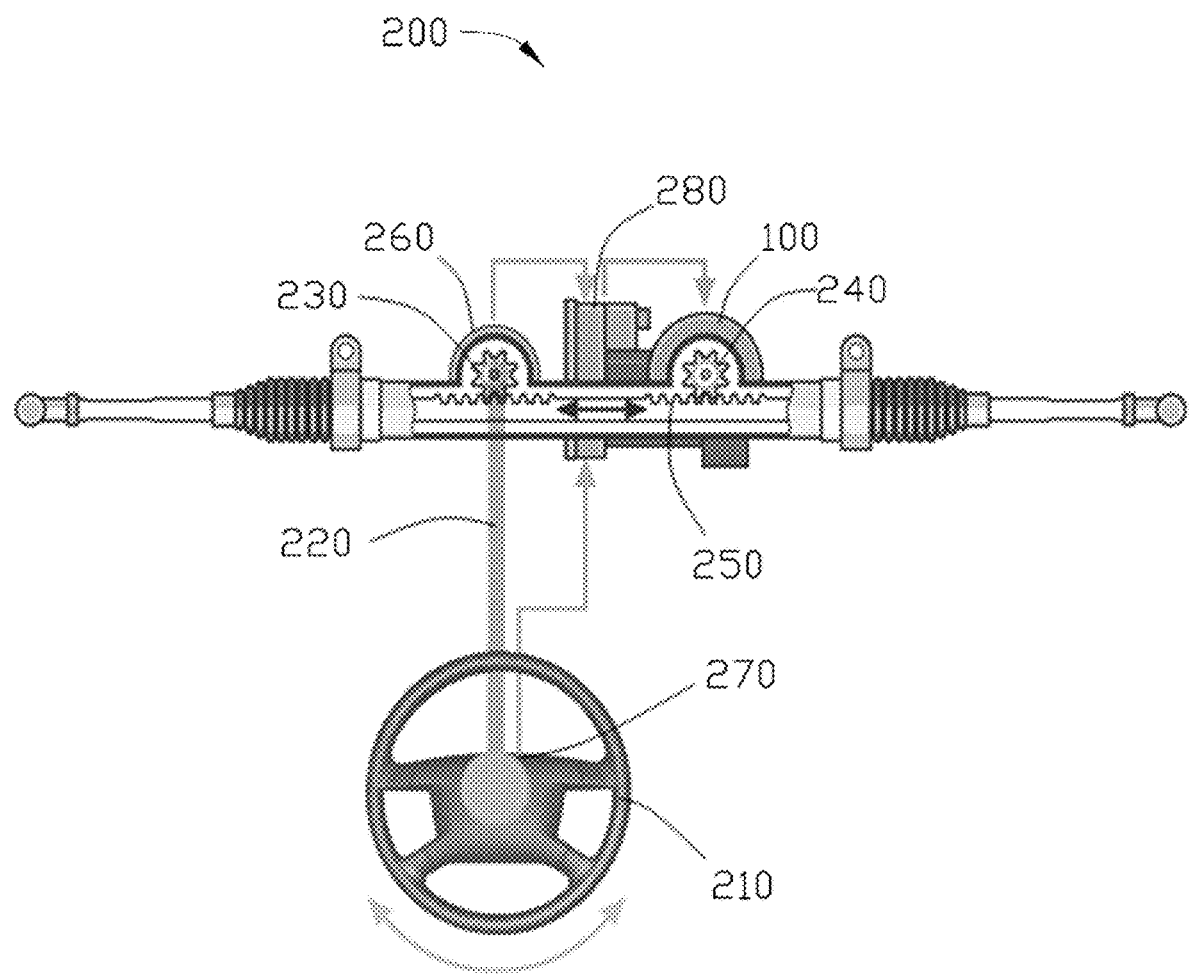
FIG. 14 illustrates an electric power steering system that employs the BLDC motor.

FIG. 14 illustrates an electric power steering system 200 that employs the BLDC motor 100 of the present invention. The electric power steering system 200 includes a steering wheel 210, a steering column 220 fixedly connected to the steering wheel 210, and a steering gear 230 coaxially fixed to the steering column 220. The BLDC motor 100 includes a rotary shaft drivingly connected with a driving gear 240, for outputting the torque of the BLDC motor 100. The driving gear 240 is drivingly connected with the steering gear 230 through a steering rack 250. As such, when the BLDC motor 100 operates, the driving gear 240 drives the steering gear 230 to rotate through the steering rack 250, thereby driving the steering column 220 to rotate and hence driving the steering wheel 210 to rotate, so as to assist the driver to manipulate the steering wheel. The electric power steering system 200 further includes a steering torque sensor 260 and a steering wheel angle sensor 270 for detecting torque and steering direction signals of the steering wheel 210 and transmitting the signals to the controller 280. In response to the signals, the controller 280 generates corresponding instructions, such that the BLDC motor 100 outputs an assisting steering torque with corresponding magnitude and direction, thereby generating an assisting force. In practice, a reduction device may be disposed between the BLDC motor 100 and the driving gear 240 for increasing the output torque.

The BLDC motor 100 of the present invention includes two sub-motors 20 and 30. The two sub-motors 20 and 30 include the common rotor 50 and their respective stators 60 that are independent from each other. The two sub-motors 20 and 30 include input terminals that are independent from each other. When the motor operates normally, the two sub-motors 20 and 30 operate as a single motor. When one of the sub-motors 20 and 30 fails, the other of the sub-motors 20 and 30 can independently operate to ensure reliability and safety of the motor. The motor of the present invention is particularly suitable for use in the steering wheel electric power steering system, although it can be used in other fields.

Therefore, the technical solutions of embodiments of the present invention have been clearly and completely described above. Apparently, the described embodiments are merely part of, rather than all of, the embodiments of the present invention. A person skilled in the art may make various combinations of technical features in the various embodiments to meet practical needs. Based on the described embodiments of the present invention, any other embodiment obtained by a person skilled in the art without paying creative efforts shall also fall within the scope of the present invention.

The invention claimed is:

1. A brushless direct current motor comprising:
an outer casing, and a first sub-motor and a second sub-motor mounted within the outer casing;
a terminal hub; and
a first conductive terminal set and a second conductive terminal set disposed on the terminal hub, the first sub-motor and the second sub-motor comprising a respective stator that is energized independently, and the first sub-motor and the second sub-motor comprising a common rotor, the first conductive terminal set being configured as a power supply branch circuit for the stator of the first sub-motor, the second conductive terminal set being configured as a power supply branch circuit for the stator of the second sub-motor, the first sub-motor and the second sub-motor being configured to selectively commonly operate as a single motor to output normal power or operate independently, and the first conductive terminal set and the second conductive terminal set are symmetrically arranged.

2. The brushless direct current motor of claim 1, wherein the stator of the first sub-motor and the stator of the second sub-motor comprise a same number of stator teeth, and the stator teeth of the first sub-motor and the stator teeth of the second sub-motor are symmetrically distributed about a diameter of the brushless direct current motor.

3. The brushless direct current motor of claim 2, wherein the first conductive terminal set and the second conductive terminal set do not overlap along a circumferential direction.

4. The brushless direct current motor of claim 1, wherein a number of polarities of the common rotor Np and number of slots of the stator Ns are both even numbers and satisfy the following equation:

$$\frac{Np}{Ns} = k - \frac{1}{2}, k = 1, 2, 3 \ldots .$$

5. The brushless direct current motor of claim 1, wherein the brushless direct current motor is a three-phase motor, its number of polarities of the common rotor Np and number of slots of the stator Ns satisfy the following equation:

$$\frac{Np}{Ns} \ne \frac{1}{4}k, k = 1, 2, 3 \ldots ,$$

where Np is an even number, and Ns=6k, k=1,2,3 . . . .

6. The brushless direct current motor of claim 1, wherein each of the first sub-motor and the second sub-motor includes six stator teeth, the stator teeth of the first sub-motor sequentially connect to form a substantially semi-circular shape, the stator teeth of the second sub-motor sequentially connect to form a substantially semi-circular shape, and the stator teeth of the first sub-motor and the stator teeth of the second sub-motor are symmetrically arranged.

7. The brushless direct current motor of claim 1, wherein the terminal hub is formed through over-molding around the first and the second conductive terminal sets.

8. The brushless direct current motor of claim 1, wherein each of the first sub-motor and the second sub-motor includes U-phase teeth, V-phase teeth and W-phase teeth, the first conductive terminal is electrically connected to the U-phase teeth, V-phase teeth and W-phase teeth of the first sub-motor, and the second conductive terminal is electrically connected to the U-phase teeth, V-phase teeth and W-phase teeth of the second sub-motor.

9. The brushless direct current motor of claim 1, wherein each conductive terminal set includes a plurality of electrically conductive elements sequentially stacked along an axial direction of the motor and insulated from each other.

10. The brushless direct current motor of claim 9, wherein each of the plurality of electrically conductive element comprises at least one electrically conductive tab, a plurality of accommodating portions is disposed at a circumferential side of the terminal hub, one of the plurality of accommodating portions accommodates one electrically conductive tab, the first sub-motor and the second sub-motor each comprises winding coils, and a connection end of each winding coil is electrically connected to one electrically conductive tab.

11. The brushless direct current motor of claim 10, wherein the terminal hub comprises a plurality of isolating portions configured to insulate adjacent connection ends from each other.

12. The brushless direct current motor of claim 1, wherein the brushless direct current motor further comprises a plurality of bobbins, each bobbin comprises an upper bobbin body and a lower bobbin body, and the upper bobbin body and the lower bobbin body are attached to opposite ends of a stator teeth, respectively.

13. The brushless direct current motor of claim 1, wherein the first sub-motor and the second sub-motor are controlled by a single controller.

14. The brushless direct current motor of claim 1, wherein the first sub-motor and the second sub-motor are controlled by two controllers, respectively, currents of the first sub-motor and the second sub-motor have a phase difference, and n-order harmonic of torque of the second sub-motor has a shift of (2k+1)/2 cycles relative to n-order harmonic of torque of the first sub-motor, where k=0,±1,±2,±3 . . . .

15. An electric power steering system comprising:
a steering wheel,
a steering column fixedly connected with the steering wheel,
a steering gear fixedly connected with the steering column; and
a motor drivingly connected with the steering gear, the motor comprising:
an outer casing, and
a first sub-motor and a second sub-motor mounted within the outer casing;
a terminal hub; and
a first conductive terminal set and a second conductive terminal set disposed on the terminal hub, the first sub-motor and the second sub-motor comprising a respective stator that is energized independently and the first sub-motor and the second sub-motor comprising a common rotor, the first conductive terminal set being configured as a power supply branch circuit for the stator of the first sub-motor, the second conductive terminal set being configured as a power supply branch circuit for the stator of the second sub-motor, the first sub-motor and the second sub-motor being configured to selectively commonly operate as a single motor to output normal power or operate independently, and the first conductive terminal set and the second conductive terminal set are symmetrically arranged.

16. The brushless direct current motor of claim 1, wherein the first conductive terminal set and the second conductive terminal set are spaced apart from each other.

17. The brushless direct current motor of claim 12, wherein a positioning portion and a locking portion are formed on an end of the upper bobbin body away from one corresponding lower bobbin body; and a plurality of latch portions is disposed at one side of the terminal hub; and the locking portion of each upper bobbin body is engaged with one corresponding of the plurality of latch portions to retain the terminal hub at one end of the stator.

18. The brushless direct current motor of claim 1, wherein a plurality of fixing portions is disposed at one side of the terminal hub; each of the plurality of electrically conductive element further comprises one power supply terminal; and the power supply terminal each passes through and is fixed in a corresponding one of the plurality of fixing portions.

19. The brushless direct current motor of claim 1, wherein the brushless direct current motor further includes an adapter; and the adapter includes a plurality of end portions and a plurality of inserting tabs, and each end portion is electrically connected to a corresponding one of the plurality of inserting tabs.

* * * * *